May 27, 1969  D. G. RADKE ET AL  3,446,533
WIRE-PULLING MEANS FOR ABSORBING THE KINETIC
ENERGY OF A MOVING BODY
Filed July 13, 1967

INVENTOR.
DONALD G. RADKE
FREDERICK C. BOOTH
BY
ATTORNEYS

United States Patent Office 3,446,533
Patented May 27, 1969

3,446,533
WIRE-PULLING MEANS FOR ABSORBING THE KINETIC ENERGY OF A MOVING BODY
Donald G. Radke, Troy, and Frederick C. Booth, Birmingham, Mich., assignors to Jim Robbins Seat Belt Co., Royal Oak, Mich.
Filed July 13, 1967, Ser. No. 653,176
Int. Cl. B60r 21/00; A47c 31/00
U.S. Cl. 297—386
8 Claims

ABSTRACT OF THE DISCLOSURE

A vehicle safety seat belt having one end adapted to apply restraining forces to a seated occupant and the other end anchored to the vehicle has an intermediate section connected to the vehicle by a stiff wire element. The intermediate connection normally forms the belt into a taut, restraining section and a slack, non-restraining section. The wire element is bent around a pin attached to the vehicle and normally provides a force transmitting connection between the taut section of the belt and the vehicle. The build up of restraining forces caused by the occupant being shifted from his seated position by abnormal forces pulls the wire around the pin so that the taut section of the belt moves with the occupant until the slack section has been fully extended with the flexing wire absorbing the kinetic energy of the moving occupant.

BACKGROUND OF THE INVENTION

Field of the invention

This invention relates to energy absorbing devices for vehicle seat belt systems and more particularly to a device which employs a stiff wire member being flexed around an abutment to absorb the kinetic energy of a moving, restrained body.

Description of the prior art

A typical vehicle safety seat belt system is designed to restrict the displacement of an occupant of the vehicle away from a seated position when the vehicle experiences a sudden deceleration or other abrupt change in momentum. The object of such seat belt systems is to prevent the occupant from continuing the direction of the former travel of the vehicle until he is stopped by relatively unyieldingly, injury-producing surfaces of the passenger compartment.

Crash studies have indicated that a secondary problem results when the occupant has both shoulder and lap belt restraints. After the vehicle's initial impact, the occupant tends to move in a forward direction until the slack in the belts has been taken up sufficiently to build up restraining forces. The relatively unyielding belts then causes the occupant to snap back toward his original position where he often experiences neck and back injuries when he impacts the back structure of the seat assembly.

The broad purpose of the present invention is to improve vehicle safety seat belt systems by providing means for eliminating this rebound effect and for absorbing the kinetic energy of the occupant as he is displaced forwardly from his seated position.

SUMMARY

The preferred embodiment of the present invention, which will be subsequently described in greater detail, is described with reference to a device attached to the shoulder harness of a vehicle safety seat belt system, however, it is to be understood that the device could as well form a part of a lap belt portion of the seat belt system.

The shoulder harness webbing is anchored to the vehicle above and slightly behind the seat assembly. An extruded block having a longitudinal slot with parallel sides is attached to the vehicle. A bolt mounted on the block has a mid-section extending perpendicular to the base of the slot. The diameter of the bolt is greater than the distance between the parallel sides of the slot with the sidewalls adjacent the bolt being enlarged around the bolt.

An elongated, relatively stiff wire member having a generally U-shaped configuration connects the mid-section of the shoulder harness webbing to the block and the bolt. The bight of the wire is engaged with a loop stitched in the mid-section of the belt and the legs are disposed adjacent the sidewalls of the slot with a bent section being formed between the pin and the enlarged sidewalls of the block.

Restraining forces built up by the shoulder harness and applied to the occupant are transmitted through a taut webbing section to the wire with the section of webbing between the wire and the vehicle being in a slack condition. When the restraining forces increase to a predetermined magnitude of 700 pounds, the taut section of webbing develops a sufficient pulling force on the wire to flex the wire around the bolt thereby permitting the occupant to move at a controlled velocity from an initial static position. As the two ends of the wire are pulled longitudinally through the slot, they flex around the bolt to absorb the kinetic energy of the moving occupant. The wire is arranged so that at the end of six inches of travel, the slack section of the webbing becomes taut and thereby provides a non-yielding connection between the occupant and the vehicle. Normally, the occupant decelerates to a full stop before the entire slack has been absorbed. Thus, the occupant comes to a cushioned stop without any rebound.

In addition to its inherent simplicity, the wire member can be easily and quickly replaced after it has been extended by absorbing the kinetic energy of the occupant.

It is therefore an object of the present invention to provide a vehicle seat belt assembly which gradually decelerates the occupant of a moving vehicle when forces cause the vehicle to decelerate abruptly with the kinetic energy of the moving occupant being absorbed so that he does not experience any rebound toward his initial position.

Another object of the present invention is to provide an energy absorbing device for a vehicle seat belt system which employs a wire member being flexed around an abutment for absorbing the kinetic energy of an occupant of the seat belt system being suddenly shifted from a seated position.

Still another object of the present invention is to provide an energy absorbing device for a vehicle shoulder harness webbing having its upper end anchored to the vehicle and an intermediate section dividing the webbing into a taut section and a slack section when the webbing restrains an occupant and attached to an elongated U-shaped relatively stiff wire element having its leg sections disposed adjacent the parallel side walls of a slotted block anchored to the vehicle, with a bolt disposed in the slot at right angles to the base of the slot and having a diameter greater than the parallel sidewalls of the slot, the slot being enlarged adjacent the bolts to permit the legs of the wire to be bent between the bolt and the sidewalls to normally provide a non-yielding connection between the mid-section of the belt and the vehicle, the wire having a stiffness chosen so that the application of a pulling force on the wire associated with a predetermined restraining force commences to flex the wire around the bolt and permits the occupant to move at a controlled velocity until the slack section becomes taut to provide a non-yielding connection between the occupant and the vehicle.

Still further objects and advantages of the present invention will readily occur to one skilled in the art to which the invention pertains upon reference to the following detailed description.

DESCRIPTION OF THE DRAWINGS

The description refers to the accompanying drawing in which like reference characters refer to like parts throughout the several views and in which.

DESCRIPTION OF THE PREFERRED EMBODIMENT

Figure 1:
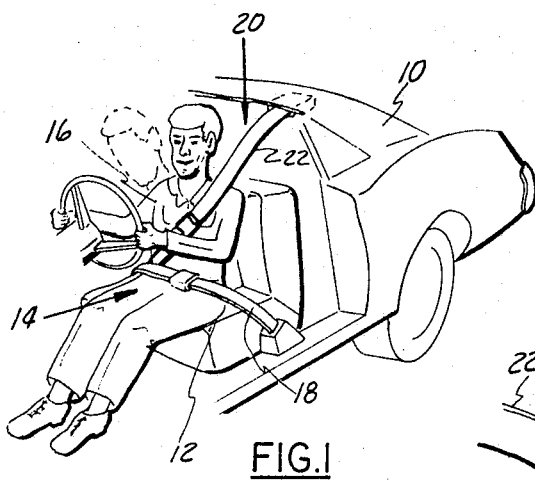
FIGURE 1 is a fragmentary perspective view of a vehicle with an occupant of the vehicle embraced by a seat belt system employing the preferred energy absorbing device.
Figure 2:
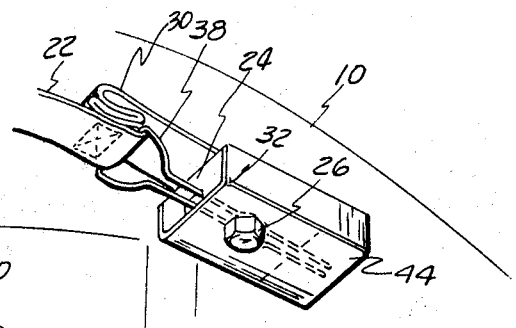
FIGURE 2 is an enlarged perspective view of the energy absorbing device of FIGURE 1 with the wire member illustrated in its initial position and showing the slack section of the webbing.
Figure 3:
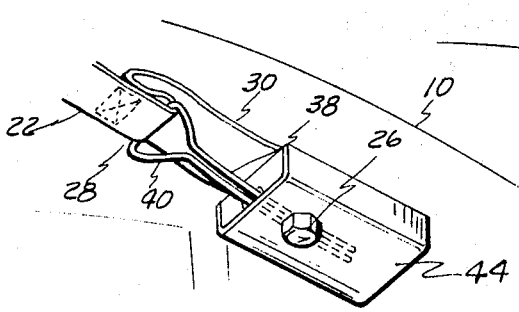
FIGURE 3 is a view similar to FIGURE 2 but with the wire having been partially flexed around the bolt.

Now referring to the drawings, FIGURE 1 illustrates a vehicle 10 having a seat assembly 12. A seat belt system generally indicated at 14 is arranged to restrain the movement of an occupant 16 of the seat 12 with respect to the vehicle 10.

The seat belt system 14 includes a lap section 18 having its lower ends anchored to the vehicle 10 and a shoulder harness assembly 20 which is coupled to the lap section 18 includes an elongated section of webbing 22 extending diagonally across the upper torso of the occupant 16 and anchored to the vehicle above and slightly behind the seat assembly 12.

As can best be seen in FIGURE 1, the lower end of the webbing 22 is adapted to partially embrace the occupant 16 for the application of restraining forces. The upper end of the belt 22 is permanently anchored to the vehicle 10 by a generally rectangular block 24 and a bolt 26 which is threadably attached to the vehicle 10.

The intermediate section of the belt 22 has a permanently stitched loop 28 that normally forms a slack 30 section of webbing between the loop 28 and the upper anchored end of the belt 22.

Figure 4:
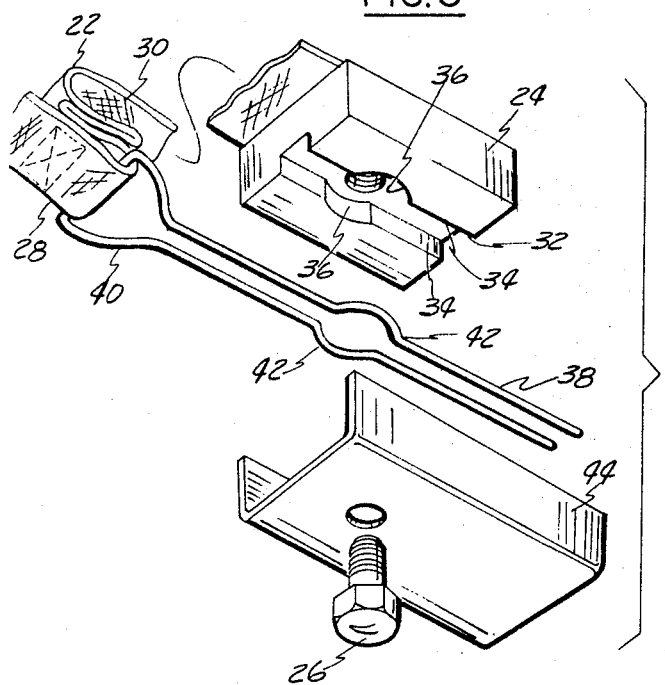
FIGURE 4 is an exploded view of the preferred energy absorbing device.

Now as best seen in FIGURE 4, the block 24 has a longitudinal slot 32 extending in the direction of longitudinal movement of the belt 22. The slot 32 is defined by a pair of spaced parallel sidewalls 34 and intermediate opposed arcuate sidewalls 36. The bolts 26 extends at right angles to the base of the slot 32 and between arcuate sidewalls 36. The diameter of the bolt 26 is greater than the distance between the parallel sidewalls 34 and slightly less than the distance between the arcuate sidewalls 36.

An elongated U-shaped wire member 38 having a bight 40 engaged with the loop 28 of the belt 22 has extending legs disposed in the slot 32 with a pair of bent mid-sections 42 bent around and between the anchor bolt 26 and the arcuate sidewalls 36 of the slot. The wire member 38 has a stiffness chosen such that when the belt 22 applies less than a predetermined restraining force on the occupant 16, a pulling force is applied on the wire which is transmitted through the bolt 26 and the block 24 to the vehicle 10 with the wire providing an immovable connection between the webbing 22 and the vehicle 10. In the embodiment illustrated, for instance, a restraining force of 700 pounds has been selected, but it is apparent that some other value could be selected if desired. In this normal condition, the slack section 30 remains in an unstressed condition and does not transmit restraining forces between the occupant and the vehicle. When the restraining forces applied by the belt 22 increase to 700 pounds, if this is the selected force, a sufficient pulling force is developed on the wire to flex the legs of the wire 38 around the bolt 26 with the taut section of the webbing permitting the occupant 16 to move forwardly at a controlled velocity. As the wire 38 is flexed around the bolt the kinetic energy of the moving occupant 16 is absorbed in the work of deforming the wire so that the occupant 16 decelerates to a gradual stop when the vehicle experiences a sudden and violent deceleration. The bolt 38 and slot thereby provide abutment means retarding the movement of the wire member 38. The wire member 38 permits the occupant 16 to move forwardly in a controlled movement until the slack in the slack section 30 has been absorbed. The full length of the belt 22 then provides a nonyielding connection between the occupant 16 and the vehicle 10. Preferably the slack section 30 permits the occupant to travel forwardly a total distance of about six inches before being fully extended.

A cover member 44 partially encloses the block 24 and is retained in place by the bolt 26.

Although we have described but one preferred embodiment of our invention, it is to be understood that various changes and revisions can be made therein without departing from the spirit of the invention as expressed in the scope of the appended claims.

Having described our invention, we claim:

1. In a vehicle, a seat belt system comprising:
   (a) an elongated safety seat belt;
   (b) first means connecting a first end of the seat belt to the vehicle such that said first end is fixed with respect to the vehicle;
   (c) second means connecting a point of said belt between its first end and its opposite, second end to the vehicle such that said point is movable, in response to a predetermined motion of the second end, from a first position in which the section of said belt between said point and said first end of the belt is slack and the section of said belt between said point and said second end is taut, toward a second position in which the belt between its first and second ends is taut.

2. The invention as defined in claim 1 wherein said second means comprises a block fixedly attached to said vehicle, said block having a longitudinal slot with spaced parallel sidewalls, said sidewalls each having an intermediate arcuate portion formed about an axis perpendicular to the longitudinal axis of said slot, a bolt mounted between said opposed arcuate portions and having a diameter greater than the distance between said parallel sidewalls, and said wire comprises a U-shaped element having its bight connected to said point of the webbing with each of its free ends being disposed between a sidewall of said slot and said bolt, being bent around said bolt, said wire being of a predetermined stiffness so as to be flexed by said bolt as it is moved in response to said predetermined motion.

3. A seat belt system as defined in claim 1, in which the first means is so formed that it prevents the first end of the belt from being separated from the vehicle in response to said predetermined motion.

4. A seat belt system as defined in claim 1, in which the second means includes an elongated element, first attaching means connecting said point of the belt to said elongated element, second attaching means connecting said elongated element to the vehicle, the elongated element being connected to the first and second attaching means such that it is movable with one of the attaching means and fixed with respect to the other attaching means as the second end of the belt is moved in its predetermined motion.

5. A seat belt system as defined in claim 4, in which said elongated element comprises a wire, and one of said attaching means comprises a pair of closely spaced members, fixed with respect to one another, and said wire is held by said pair of closely spaced members such that in response to said predetermined motion, the wire is moved between said pair of members and deformed by said members as it passes therebetween.

6. A seat belt system as defined in claim 5, in which the pair of closely spaced members hold the wire in such a manner that it is restrained against motion with respect to said pair of members in the direction of its length unless a predetermined force is applied on said wire by the belt.

7. A seat belt system as defined in claim 5, in which one of said closely spaced members has a slot defined by a pair of spaced walls, the wire is disposed in the slot adjacent one of the walls and the other member comprises a bolt disposed in said slot to hold said wire between the wall and the bolt and to bend the wire as it is moved between the bolt and the wall in response to said predetermined motion.

8. In a vehicle, the combination comprising:
 (a) an elongated seat belt;
 (b) a block member having an elongated slot;
 (c) a bolt fastening the first member and a first end of the belt to the vehicle such that they are fixed against motion with respect to the vehicle, and the second end of the belt is movable thereto, and a portion of the bolt is disposed in said slot, and
 (d) a wire element of a predetermined stiffness connected to a point of the belt that is spaced from its first end, said wire element having an elongated section disposed in the slot and bent around a portion of the bolt, and being movable in the direction of its length only in response to a predetermined motion of the second end of the belt from a first position, in which a section of the belt between said point and the first end of the belt is slack and a section of the belt between said point and its second end is taut, a predetermined distance toward a second position in which the belt between its first and second ends is taut, said predetermined belt motion causing a motion of the wire in which portions of the wire are successively bent around the bolt.

References Cited
UNITED STATES PATENTS

| | | |
|---|---|---|
| 1,511,264 | 10/1924 | Carter. |
| 3,106,989 | 10/1963 | Fuchs. |
| 3,195,685 | 7/1965 | Blackstone _____ 297—386 X |
| 3,198,288 | 8/1965 | Presunka _____ 297—386 X |
| 3,232,383 | 2/1966 | Moberg _____ 297—386 X |
| 3,280,942 | 10/1966 | Millington. |
| 3,302,973 | 2/1967 | Ravau _____ 244—151 |
| 3,308,908 | 3/1967 | Bunn _____ 297—386 |
| 3,361,475 | 1/1968 | Villers _____ 297—386 |

JAMES T. McCALL, *Primary Examiner.*

U.S. Cl. X.R.

188—1